US012591564B2

(12) United States Patent
Talreja et al.

(10) Patent No.: US 12,591,564 B2
(45) Date of Patent: Mar. 31, 2026

(54) MUTUAL INFORMATION-DRIVEN ADDRESS VALIDATION SYSTEM LEVERAGING DATASET DISTILLATION AND CONFORMAL PREDICTION

(71) Applicant: Dell Products L.P., Round Rock, TX (US)

(72) Inventors: Kailash Talreja, Mumbai (IN); Mallikarjun Ellaboina, Hyderabad (IN); Saurabh Jha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/888,849

(22) Filed: Sep. 18, 2024

(65) Prior Publication Data

US 2026/0079911 A1      Mar. 19, 2026

(51) Int. Cl.
   G06F 7/00      (2006.01)
   G06F 16/23     (2019.01)
   G06F 17/00     (2019.01)
(52) U.S. Cl.
   CPC ................................. G06F 16/2365 (2019.01)
(58) Field of Classification Search
   None
   See application file for complete search history.

(56) References Cited

U.S. PATENT DOCUMENTS

| | | | |
|---|---|---|---|
| 12,198,030 B1 * | 1/2025 | Mysore ............... | G06F 11/3684 |
| 2020/0401948 A1 * | 12/2020 | Ma ...................... | G06F 11/3495 |
| 2024/0422534 A1 * | 12/2024 | Ancha ................... | H04W 12/06 |
| 2025/0039239 A1 * | 1/2025 | Parla .................. | H04L 63/1425 |

* cited by examiner

*Primary Examiner* — Tuan A Pham

(74) *Attorney, Agent, or Firm* — Chamberlain, Hrdlicka, White, Williams & Aughtry; Aly Z. Dossa

(57) ABSTRACT

A method for address validation includes obtaining, by a data system, two entity datasets, wherein each of the two entity datasets comprises data for a plurality of entities, in response to obtaining the two entity datasets, performing a data distillation on the two entity datasets to obtain an optimized dataset, performing a mutual information maximization on the optimized dataset and the two entity datasets to obtain a maximized dataset, obtaining an input address to be validated, performing an address validation on the input address using a validation model and the maximized dataset to obtain a validation result, performing a conformal prediction on the input address using a conformal prediction model to obtain a confidence score of the validation result, and updating the validation model based on the confidence score, the validation result, and the input address to obtain an updated validation model.

17 Claims, 6 Drawing Sheets

System
100

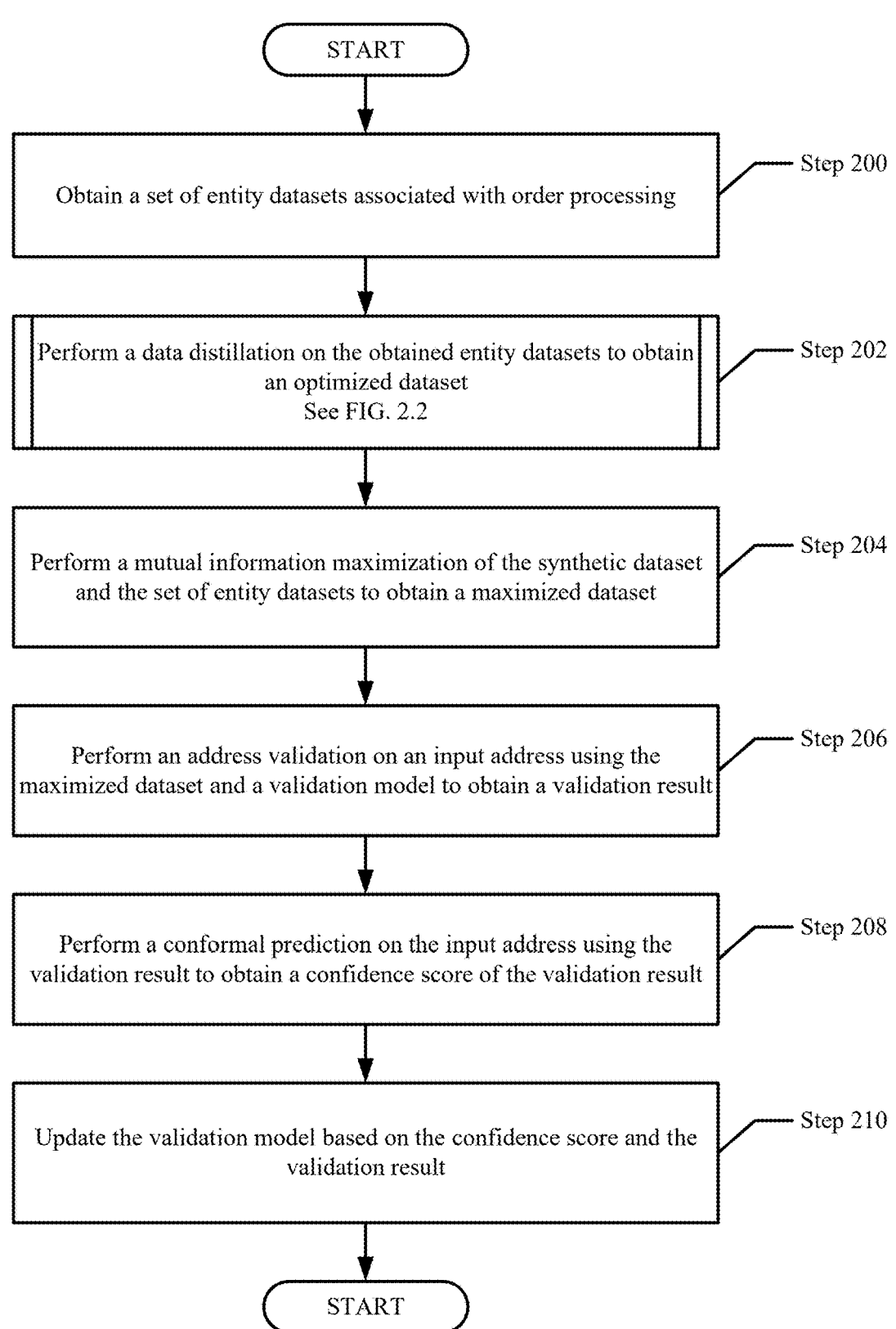
FIG. 2.1

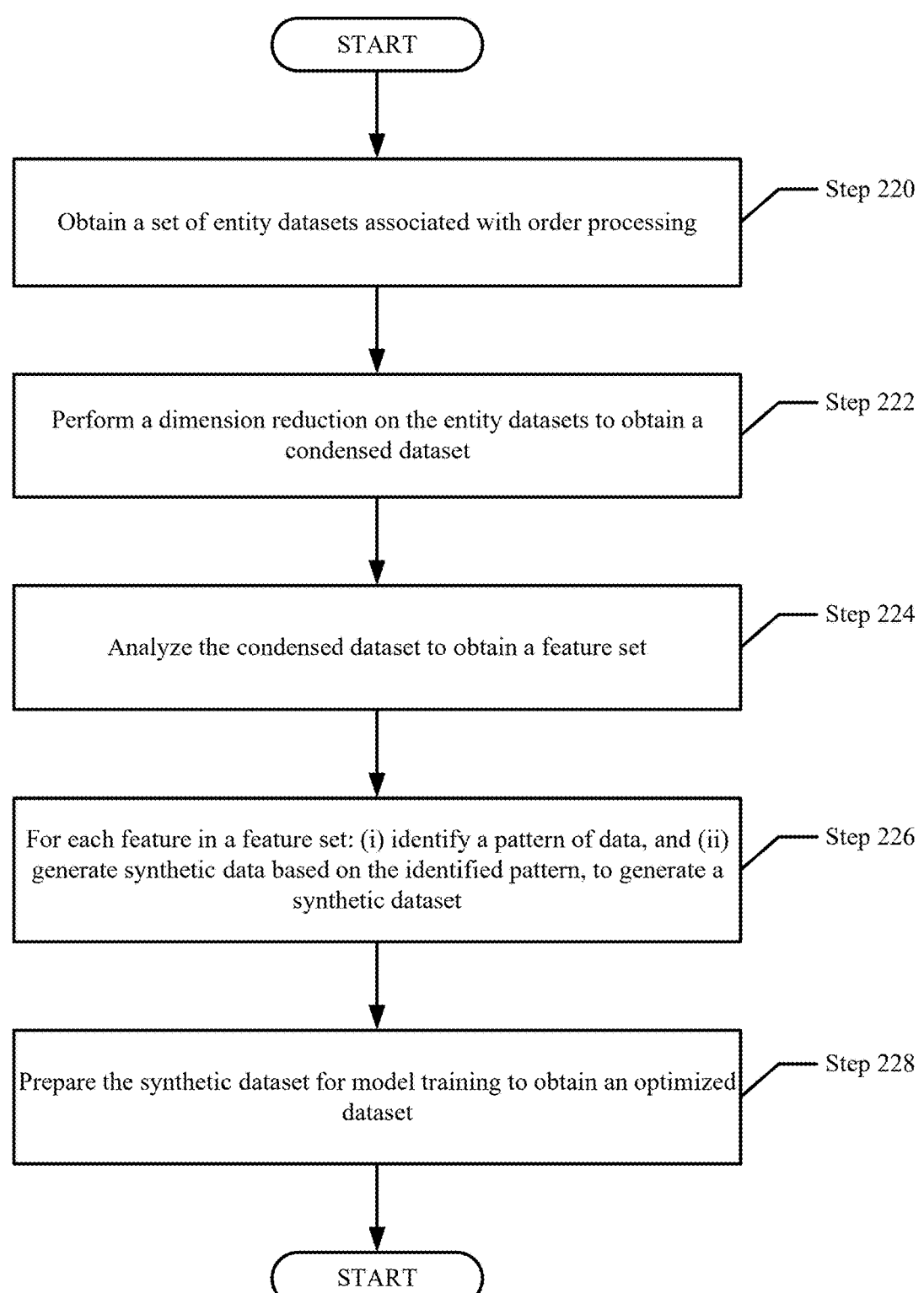
FIG. 2.2

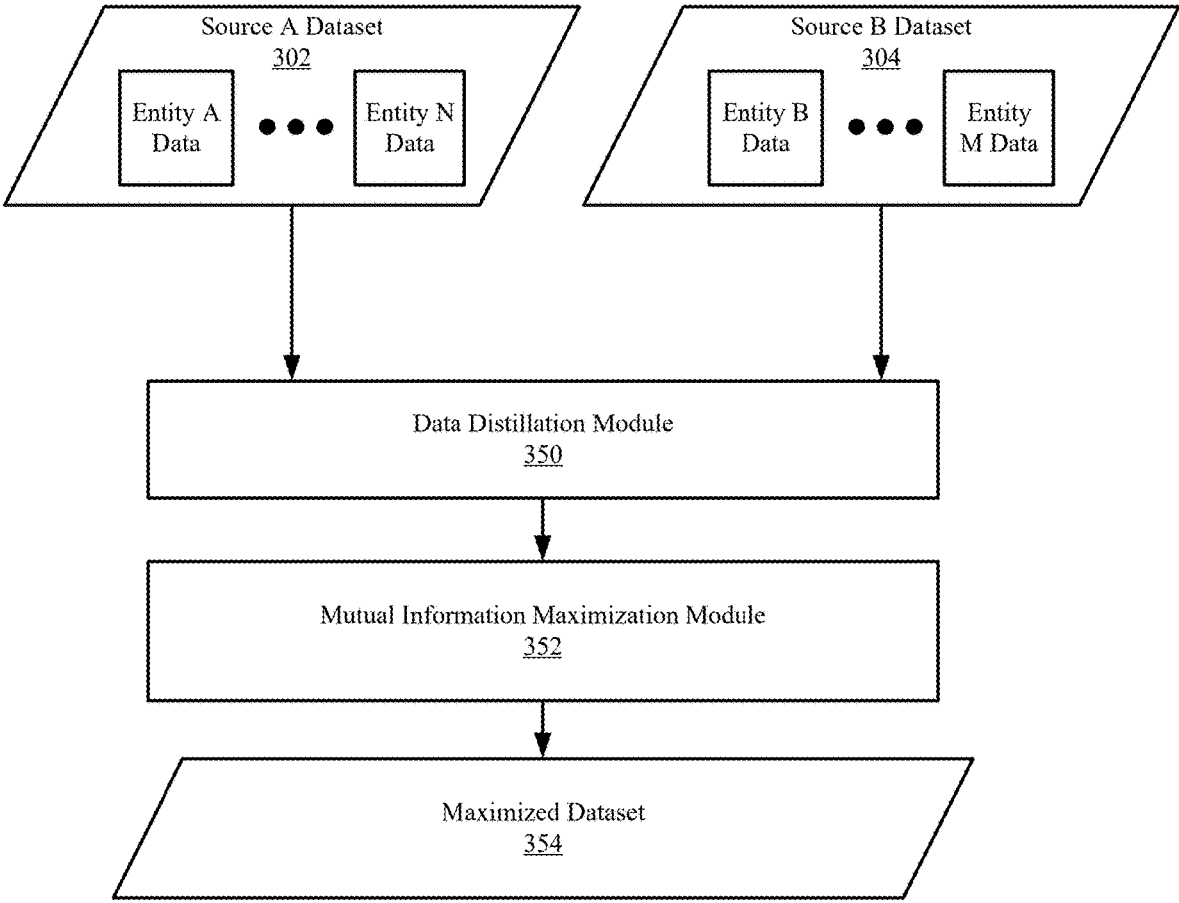
FIG. 3.1

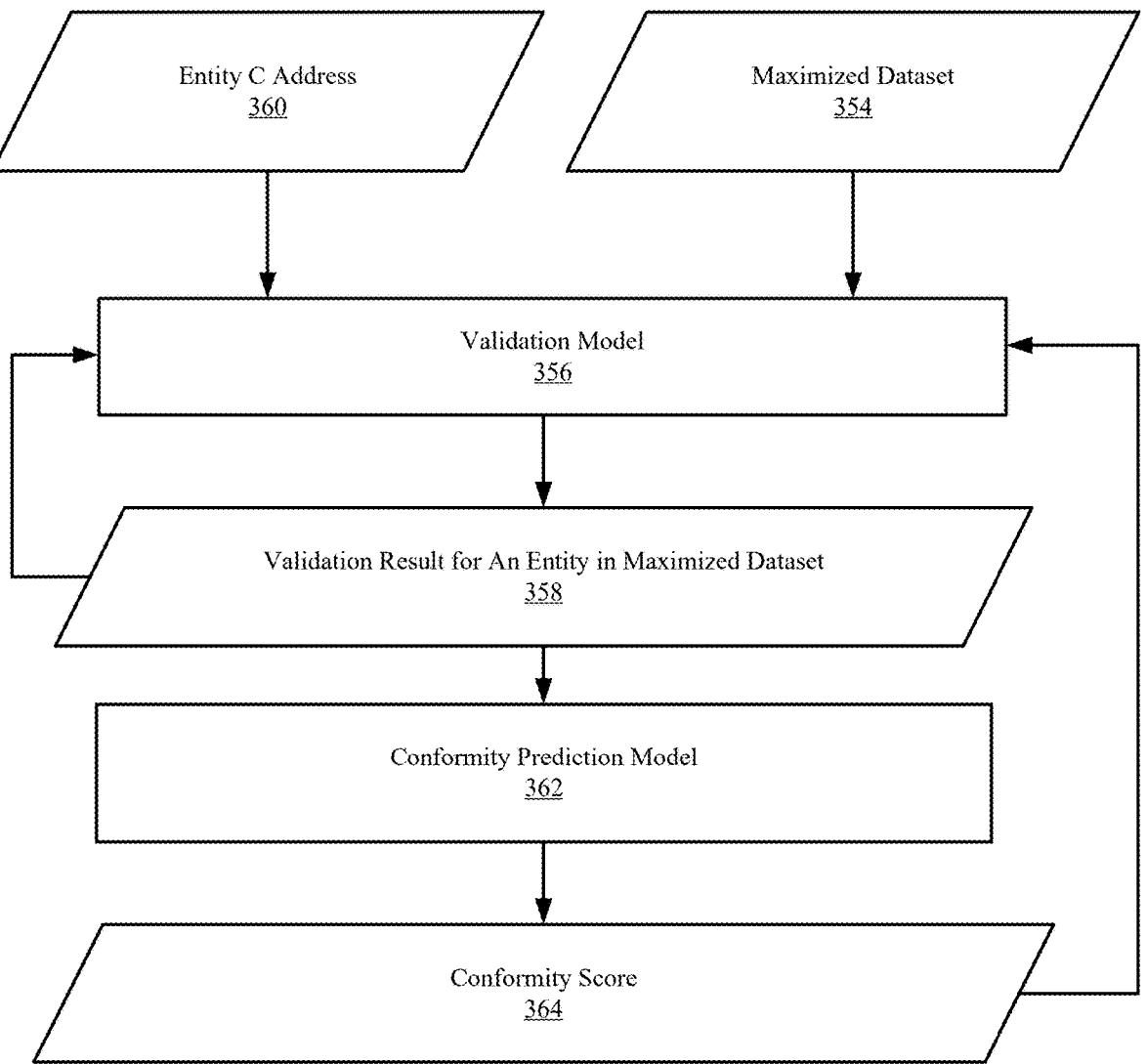
FIG. 3.2

Computer
400

MUTUAL INFORMATION-DRIVEN ADDRESS VALIDATION SYSTEM LEVERAGING DATASET DISTILLATION AND CONFORMAL PREDICTION

BACKGROUND

Obtaining identifiable information for an entity from multiple data sources may impose challenges in data analysis if the information for the entity is obtained in different formats and/or organization from the multiple data sources. For example, it may be difficult to attribute information to the same entity if the formatting of the information is different between the multiple data sources. Such challenges may result in inaccuracy or inefficiency in managing large and diverse datasets.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a flowchart of a method of performing address validation in accordance with one or more embodiments of the invention.

FIG. 2.2 shows a flowchart of a method of obtaining an optimized dataset in accordance with one or more embodiments of the invention.

FIGS. 3.1-3.2 show an example in accordance with one or more embodiments of the invention.

DETAILED DESCRIPTION

Figure 1:
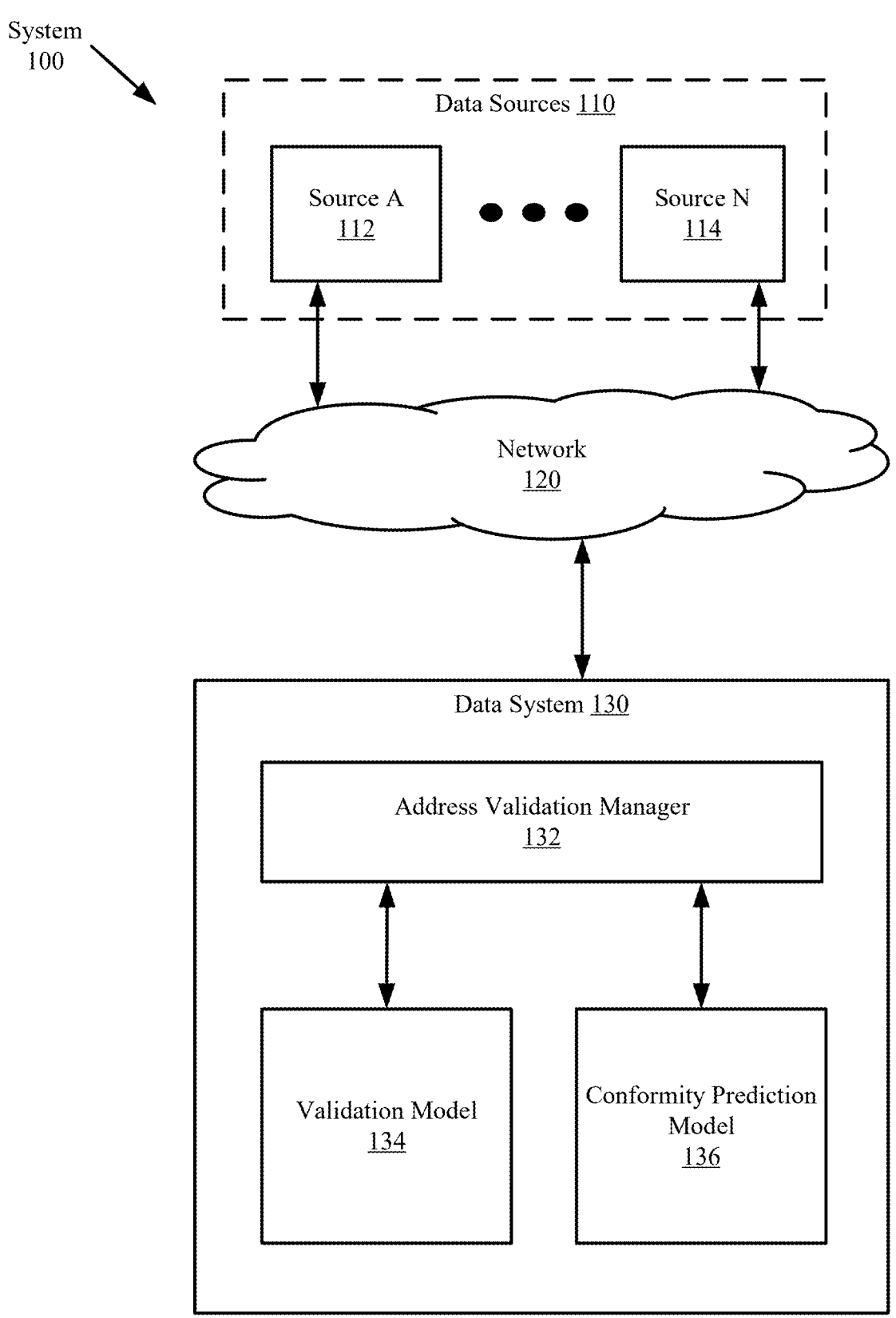
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Embodiments disclosed herein include systems and methods for address validation. Embodiments of the invention include performing data collection of data for any number of entities such as people, organizations, and/or other entities. The data collection may be obtained from multiple data sources. Each entity may be associated with an address (e.g., a mailing address). The data collected from one source for an entity may specify the corresponding address in one format, whereas the data collected from another source for the entity may specify the corresponding address in a second format. It may be beneficial for a data system collecting the data from these two sources to perform address validation to confirm whether the addresses in the two formats correspond to the same address. Embodiments disclosed herein include a data system performing such data validation by performing a dataset distillation, mutual information maximization, address validation for one of the addresses, a conformal prediction for confidence scoring, and output generation.

The following describes various embodiments of the invention.

FIG. 1 shows a system in accordance with one or more embodiments of the invention. The system (100) includes any number of data sources (110) a data system (130) connected via a network (120). The overall system (100) may include additional, fewer, and/or different components without departing from the scope of the invention. Each component may be operably connected to any of the other component via any combination of wired and/or wireless connections. Each component illustrated in FIG. 1 is discussed below.

Figure 4:
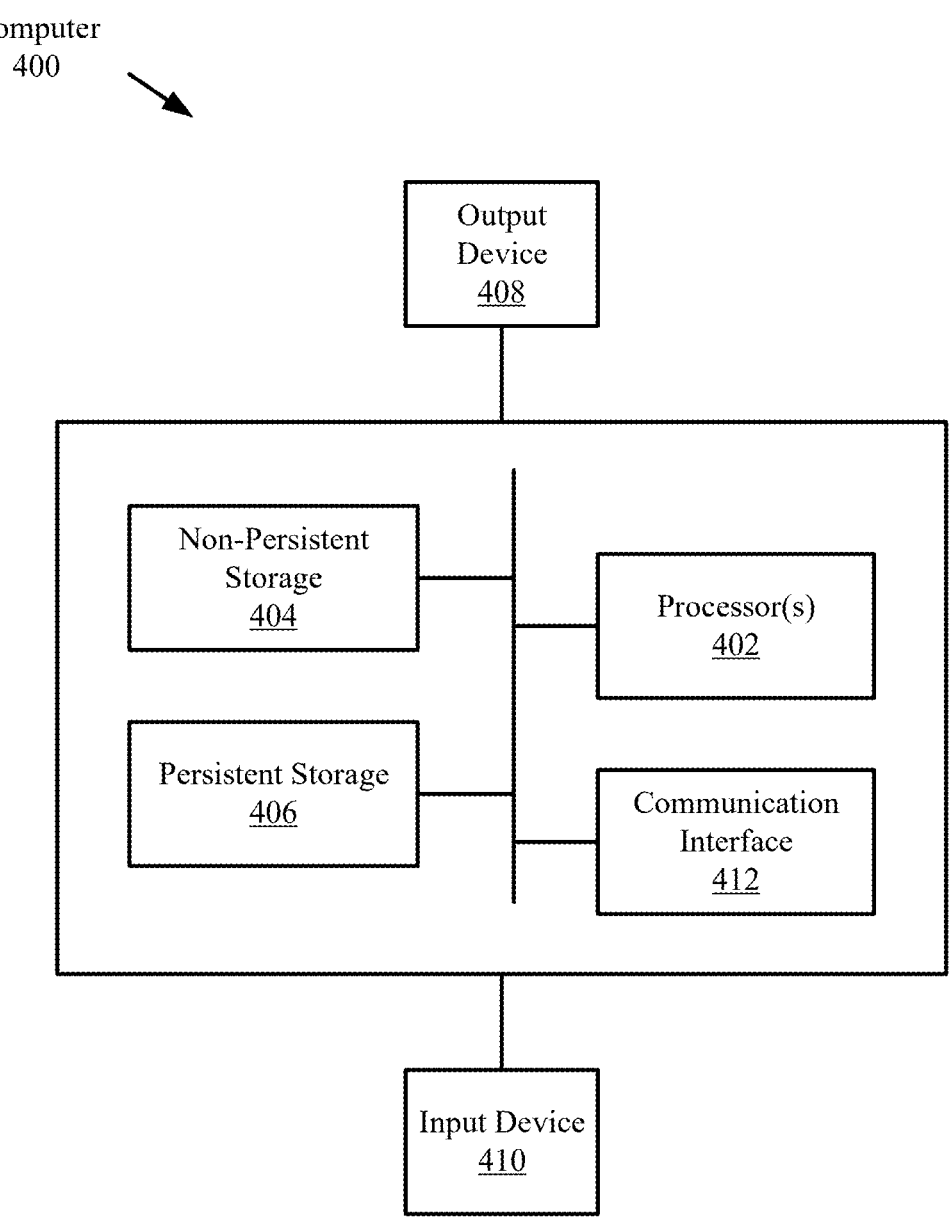
FIG. 4 shows a diagram of a computing device in accordance with one or more embodiments of the invention.

In one or more embodiments, each data source (112, 114) is implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the data source (112, 114) described throughout this present disclosure.

In one or more embodiments of the invention, each data source (112, 114) is implemented as a logical device. A logical device may utilize the computing resources of any number of computing devices (refer to FIG. 4) to provide the functionality of the data source (112, 114) described throughout this present disclosure.

In one or more embodiments, each data source (112, 114) represents an independent organization (e.g., an enterprise) that includes any number of users managing data online and providing data to the data system (130). The data may include information about one or more entities such as, for example, first names, last names, mailing addresses, contact information, and/or other information without departing from the invention. The data provided by the data sources (112, 114) may include information provided by users using applications provided by computing devices and stored by the data sources (110).

As users provide information to the data sources (112, 114) at different points in time, the information may represent the same entity (e.g., user), but may be input to each data source (112, 114) using various formats. For example, a user may provide a corresponding mailing address to a first data source (e.g., 112) in one format (e.g., "123 House St. #89"). At a later point in time, the user may provide its mailing address to a second data source (e.g., 114) in a second format (e.g., "123 House Street, Apartment 29"). Despite the data points provided to the two data sources (112, 114) comprise different information, the two data points represent the same mailing address.

A data system (130) may implement address validation processes to resolve the information provided by the data sources (110). In one or more embodiments, the data system (130) includes an address validation manager (132), a validation model (134), and a conformity prediction model (136). The data system (130) may include additional, fewer, and/or different components without departing from the invention.

In one or more embodiments, the address validation manager (132) includes functionality for obtaining the data from the data sources (110) via the network (120) and using the validation model (134) and the conformity prediction model (136) to perform the address validation in accordance with FIGS. 2.1-2.2. In one or more embodiments, the validation model (134) is a data structure that takes, as inputs, an input address and a dataset to output validation results that determine whether any one of the addresses in the dataset correspond to the input address. The conformity prediction model (136) is a data structure that generates a conformity score for the validation results. The conformity score represents a confidence in the validation results.

In one or more embodiments, the data system (130) (and/or each component illustrated within) is implemented as a computing device (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the data system (130) (and/or each component illustrated within) described throughout this present disclosure including the methods of FIGS. 2.1 and 2.2.

Alternatively, in one or more embodiments of the invention, the data system (130) (and/or each component illustrated within) is implemented as a logical device. A logical device may utilize the computing resources of any number of computing devices to provide the functionality of the data system (130) (and/or each component illustrated within) described throughout this present disclosure including the methods of FIGS. 2.1 and 2.2.

FIG. 2.1 shows a flowchart of a method of performing address validation in accordance with one or more embodiments of the invention. The method shown in FIG. 2.1 may be performed by, for example, a data system (e.g., 130, FIG. 1). Other components of the system in FIG. 1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner with other steps in other methods without departing from the invention.

Turning to FIG. 2.1, in step 200, a set of entity datasets associated with order processing are obtained. The set of entity datasets may be obtained using the data collection of data from the data sources. The data collection encompasses both structured data (such as data from forms with specific fields) and unstructured data (such as addresses in free-text formats from emails or notes). Addresses are collected in various formats, including residential, commercial, rural, P.O. Boxes, and even non-standard formats that might appear in user-generated content. In one or more embodiments, the data is assumed to be accurate even if in various formats. The data collection adheres to data privacy laws and regulations, such as, for example the General Data Protection Regulation (GDPR) in Europe or California Consumer Privacy Act (CCPA) in California. The collected data undergoes cleaning to remove duplicates, correct errors, and standardize formats where possible. This step is crucial to improve the quality and usability of the data. Data may be categorized based on certain attributes, like geographical location, type (residential or commercial), or format. Tagging may help in the subsequent data distillation process.

In step 202, a data distillation is performed on the obtained set of entity datasets to obtain an optimized dataset. In one or more embodiments, the primary goal of the data distillation is to condense the vast array of collected address data into a smaller, more manageable dataset that retains the essential characteristics of the original data. Through data distillation, the aim is further to enhance the overall quality of the dataset, ensuring that it accurately represents real-world variations and complexities in address formats. In one or more embodiments, the data distillation is performed using the method described in FIG. 2.2. Other methods may be performed for the data distillation without departing from the invention.

In step 204, a mutual information maximization is performed on the optimized dataset to obtain a maximized dataset. In one or more embodiments of the invention, the purpose of the mutual information maximization is to measure and maximize the amount of shared information between the optimized dataset (created in the data distillation process discussed in step 202 and FIG. 2.2) and the real-world address dataset. By maximizing mutual information, the system can ensure that the optimized dataset is a highly representative and informative proxy for the actual address data.

In one or more embodiments, mutual information (MI) is a measure from information theory that quantifies the amount of information obtained about one random variable through observing another random variable. Given two random variables X (representing the real-world dataset) and Y (representing the optimized dataset), MI is defined as: $I(X;Y)=\Sigma p(x,y) \log(p(x,y)p(x)p(y))$, where $(p(x,y))$ is the joint probability distribution of X and Y, and $(p(x))$ and $(p(y))$ are the marginal probability distributions.

The data system calculates the mutual information between the optimized dataset and the real-world address dataset. This involves assessing how well the optimized dataset predicts or explains the variance in the real dataset. The system iteratively updates the optimized dataset to maximize the MI score. This could involve adjusting features, weights, or representations within the optimized dataset to better align with the real dataset. Using the MI maximized dataset (also referred to herein as the maximized dataset), the machine learning models are trained or refined. This ensures that the models are attuned to the most informative and representative features of the address data. The goal is to adjust Y (the optimized dataset) to maximize $((X;Y))$. This can be achieved through iterative algorithms such as gradient ascent or other optimization techniques without departing from the invention. By maximizing the mutual information, the system gains a deeper and more nuanced understanding of the address data, which is beneficial for accurate address validation. MI maximization ensures that the optimized dataset and, by extension, the machine learning models are highly aligned with the real-world data, leading to more accurate address predictions and validations. The result of applying the MI maximization is the maximized dataset In step 206, an address validation is performed on an input address using the maximized dataset and a validation model to obtain a validation result. In one or more embodiments, the address validation process includes inputting one or more addresses to the validation model to output a validation result. The validation model may be trained using the maximized dataset.

In step 208, a conformal prediction is performed on the input address using the validation result to obtain a confidence score of the validation result. In one or more embodiments, the conformal prediction is used for quantifying the certainty of the address validation results. The primary goal of this step is to assign a confidence score to each address validation decision, indicating the likelihood that the decision is correct. This process provides a quantifiable measure of uncertainty or certainty associated with each validation, enhancing the reliability and transparency of the system. Conformal prediction is a statistical framework that provides valid measures of confidence or prediction regions for machine learning models. It includes using the outputs of machine learning models (e.g., validation results from the validation model) and a calibration dataset to determine how 'strange' or 'unusual' a new observation is compared to previous observations. A nonconformity measure is a function that quantifies how different a new example is from the examples seen during training. This could be based on the distance from the decision boundary, prediction error, or other relevant metrics.

Given a validation result v and a calibration dataset $\mathcal{D}$ , a nonconformity measure $\alpha$ is calculated for each point in $\mathcal{D}$ and for v. The nonconformity measure is a function $\alpha{:}X{\rightarrow}R$, where X is the space of possible data points, which quantifies how different a new point is from the points in $\mathcal{D}$ The p-value for the validation result v is calculated as follows: $(p(v)=|\{x\in\mathcal{D}:\alpha(x)\geq\alpha(v)\}|+1)/(|\mathcal{D}|+1)$, where $|\{x\in\mathcal{D}:\alpha(x)\geq\alpha(v)\}|$ is the number of points in $\mathcal{D}$ that are as, or more, nonconforming than v. The confidence score for v is then defined as $1-(v)$, indicating the probability of v conforming with the calibration data. In the address validation process, v would represent the validation result of a new address, and $\mathcal{D}$ would be a set of addresses with known validation results used to calibrate the model. Conformal prediction provides a statistically valid way of assigning confidence scores to address validation results, enhancing the reliability and interpretability of the validation system. The system uses a calibration dataset (part of validation data) to understand the typical nonconformity scores for correct predictions. This calibration helps in understanding what level of nonconformity is 'normal' and what level indicates an unusual or doubtful prediction. For each new address validation, the system calculates its nonconformity score. The confidence score is then derived based on how this nonconformity score compares to the calibration data. Lower nonconformity generally means higher confidence. By providing confidence scores, the system enables users to make more informed decisions, especially in cases where a manual review might be needed. Confidence scores provide a layer of transparency and reliability to the data system, increasing trust in its validation results.

In step 210, the validation model is updated based on the confidence score and the validation result. The validation model may further be updated based on feedback obtained from external sources such as, for example, manual reviews of validation results, user corrections, or automated analysis of discrepancies between predicted and actual outcomes. Trends, patterns, and/or specific issues may be analyzed using the confidence scores and the validation results of input addresses to update the validation and conformal prediction models. For example, retraining may be performed with new data, parameters of the models may be tweaked, or new features may be incorporated to the models. Testing of the updated models may be performed to evaluate and improve the accuracy of the new models.

FIG. 2.2 shows a flowchart of a method of obtaining an optimized dataset in accordance with one or more embodiments of the invention. The method shown in FIG. 2.2 may be performed by, for example, a data system (e.g., 130, FIG. 1). Other components of the system in FIG. 1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner with other steps in other methods without departing from the invention.

In step 220, a set of entity datasets are obtained. The obtained set of entity datasets may be the same set of entity datasets obtained from step 200 in FIG. 2.1.

In step 222, a dimension reduction is performed on the entity datasets to obtain a condensed dataset. The dimension reduction may include filtering out variables of the entity datasets that are not relevant for address validation. Given a dataset $X \in Rn \times d$, where n is the number of samples and d is the number of features, the following process is performed for dimension reduction: Compute the covariance matrix: $C=1/(n-1) X^T*X$, find the eigenvalues and eigenvectors of C, select the top k eigenvectors to form the projection matrix W, and project X onto the new subspace: $Y=XW$.

In step 224, the condensed dataset is analyzed to obtain a feature set. In one or more embodiments, advanced algorithms are employed to identify patterns, correlations, and key features within this condensed dataset. The system isolates the most significant features and patterns from the address data. This includes identifying commonalities and variances across different address types and formats.

In step 226, for each feature in the feature set, (i) a pattern of data is identified, and (ii) synthetic data is generated based on the identified pattern. A synthetic dataset is generated based on the synthetic data and the condensed dataset. In one or more embodiments, the generation of the synthetic data includes the following process: define a generator G $(z;\theta g)$ that maps from a latent space (z) to the data space; define a discriminator $(D(x;\theta d))$ that outputs the probability that (x) came from the training data; train G and D by optimizing: $minGmaxDV(D,G)=Ex\sim pdata(x)$ $[log(D(x))]+Ez\sim pz(z)$ $[log(1-D(G(z)))]$.

In one or more embodiments, data processing algorithms are utilized for identifying the patterns for the synthetic data generation. For example, clustering algorithms may be used to group similar addresses, dimensionality reduction techniques to identify key features, and generative models to create synthetic data points. Statistical methods may be used to understand the distribution and characteristics of the address data, aiding in the distillation process.

In one or more embodiments, the synthetic dataset includes the condensed data and the synthetic data generated in step 226.

In step 228, the synthetic dataset is prepared for model training to obtain an optimized dataset. Specifically, the synthetic dataset is standardized so that it may be used for input to a validation model during address validation of an input address. The optimized dataset captures the core characteristics of the original address data, optimized for training machine learning models such as the validation model (discussed in FIG. 2.1). The data distillation process balances diversity and representativeness while significantly reducing the dataset size.

EXAMPLE

FIGS. 3.1-3.2 show a diagram of an example system in accordance with one or more embodiments of the invention. The example system of FIGS. 3.1-3.2 may be an embodiment of a data system (130, FIG. 1) discussed throughout this disclosure. The example system includes two datasets (302, 304) each from a different source. Source A dataset (302) includes data for entities A-N. Source B dataset (304) includes data for entities B-M. There may be overlap between entities A-N and entities B-M. Said another way, data of at least one of the entities of source A dataset (302) is also in source B dataset (304). The data from the two datasets (302, 304) are distilled using a data distillation module (350) of the example system in accordance with FIG. 2.2. The two datasets are also processed using a mutual information maximization module (352) in accordance with step 204 of FIG. 2.1 to generate the maximized dataset (354). As discussed in FIG. 2.1, the maximized dataset is a modified dataset that includes synthetic data and condensed data of the source A and B datasets (302, 304). The maximized dataset (354) is modified for training of a validation model (illustrated in FIG. 3.2).

Turning to FIG. 3.2, an address is obtained and evaluated for address validation. The entity C address (360) is applied to a validation model (356) that has been trained using the maximized dataset (354). The validation model (356) outputs a validation result for at least one entity of the maximized dataset (358). The validation result (358) indicates that entity C address (360) corresponds to an address of one entity in the maximized dataset (358). The validation result (358) is applied to a conformity model (362) of the data system to obtain a conformity score (364). The conformity model (362) applies the conformal prediction of step 208 in FIG. 2.1 to obtain the conformity score (364) corresponding to the validation result (358). The validation result and the conformity score (364) are used for retraining of the validation model (356) for future address validation of input addresses to further manage entity resolution of the entities in the two source datasets (302, 304).

End of Example

As discussed above, embodiments of the invention may be implemented using computing devices. FIG. 4 shows a diagram of a computing device in accordance with one or more embodiments of the invention. The computer (400) may include one or more computer processor(s) (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computer (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computer (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (408, 410) may be locally or remotely connected to the computer processor(s) (402), non-persistent storage (404), and persistent storage (406). Many different types of computing devices exist, and the aforementioned input and output device(s) may take other forms.

Embodiments of the invention provide resolution of data obtained from multiple sources that include addresses of entities in heterogeneous formats. Embodiments enable entity management of large sets of data by using machine learning models to perform the address validation for new obtained addresses. The address validation may provide entity resolution for the large datasets.

Thus, embodiments of the invention may address the problem of data security, data integrity, and access to large datasets in a distributed system. The problems discussed above should be understood as being examples of problems solved by embodiments of the invention of the invention and the invention should not be limited to solving the same/ similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing address validation, the method comprising:

obtaining, by a data system, two entity datasets, wherein each of the two entity datasets comprises data for a plurality of entities;

in response to obtaining the two entity datasets, performing a data distillation on the two entity datasets to obtain an optimized dataset, wherein performing the data distillation comprises:

performing a dimension reduction on the two entity datasets to obtain a condensed dataset;

analyzing the condensed dataset to obtain a feature set;

identifying a first pattern of data for a first feature of the feature set;

generating first synthetic data using the first pattern of data;

identifying a second pattern of data for a second feature of the feature set;

generating second synthetic data using the first pattern of data; and preparing the condensed dataset, the first synthetic data, and the second synthetic data for model training to obtain the optimized dataset;

performing a mutual information maximization on the optimized dataset and the two entity datasets to obtain a maximized dataset;

obtaining, after obtaining the maximized dataset, an input address to be validated;

performing an address validation on the input address using a validation model and the maximized dataset to obtain a validation result, wherein the validation result indicates whether the input address matches to one of the entities in the maximized dataset;

performing a conformal prediction on the input address using a conformal prediction model to obtain a confidence score of the validation result; and updating the validation model based on the confidence score, the validation result, and the input address to obtain an updated validation model.

2. The method of claim 1, wherein the first synthetic data and the second synthetic data is generated using a generative adversarial network (GAN).

3. The method of claim 1, wherein a first entity dataset of the two entity datasets is obtained from a first data source, wherein a second entity dataset of the two entity datasets is obtained from a second data source, and wherein the first data source and the second data source are independent from each other.

4. The method of claim 1, wherein the maximized dataset comprises an address of a first entity in a first format, and wherein the input address is associated with the first entity, and wherein the input address is in a second format.

5. The method of claim 1, wherein the mutual information maximization comprises an iterative updating of features on the optimized dataset and calculating a mutual information score for an iteration of the optimized dataset.

6. The method of claim 1, further comprising:

obtaining, after the updating, a second input address, wherein the second input address is in a first format;

performing the address validation on the second input address using the updated validation model and the maximized dataset to obtain a second validation result, wherein the second validation result indicates a match to a second address of the maximized dataset, and wherein the second address of the maximized dataset is in a second format.

7. A non-transitory computer readable medium comprising computer readable program code, which when executed by a computer processor enables the computer processor to perform a method for managing data access, the method comprising:

obtaining, by a data system, two entity datasets, wherein each of the two entity datasets comprises data for a plurality of entities;

in response to obtaining the two entity datasets, performing a data distillation on the two entity datasets to obtain an optimized dataset, wherein performing the data distillation comprises:

performing a dimension reduction on the two entity datasets to obtain a condensed dataset;

analyzing the condensed dataset to obtain a feature set;

identifying a first pattern of data for a first feature of the feature set;

generating first synthetic data using the first pattern of data;

identifying a second pattern of data for a second feature of the feature set;

generating second synthetic data using the first pattern of data; and preparing the condensed dataset, the first synthetic data, and the second synthetic data for model training to obtain the optimized dataset;

performing a mutual information maximization on the optimized dataset and the two entity datasets to obtain a maximized dataset;

obtaining, after obtaining the maximized dataset, an input address to be validated;

performing an address validation on the input address using a validation model and the maximized dataset to obtain a validation result, wherein the validation result indicates whether the input address matches to one of the entities in the maximized dataset;

performing a conformal prediction on the input address using a conformal prediction model to obtain a confidence score of the validation result; and updating the validation model based on the confidence score, the validation result, and the input address to obtain an updated validation model.

8. The non-transitory computer readable medium of claim 7, wherein the first synthetic data and the second synthetic data is generated using a generative adversarial network (GAN).

9. The non-transitory computer readable medium of claim 7, wherein a first entity dataset of the two entity datasets is obtained from a first data source, wherein a second entity dataset of the two entity datasets is obtained from a second data source, and wherein the first data source and the second data source are independent from each other.

10. The non-transitory computer readable medium of claim 7, wherein the maximized dataset comprises an address of a first entity in a first format, and wherein the input address is associated with the first entity, and wherein the input address is in a second format.

11. The non-transitory computer readable medium of claim 7, wherein the mutual information maximization comprises an iterative updating of features on the optimized dataset and calculating a mutual information score for an iteration of the optimized dataset.

12. The non-transitory computer readable medium of claim 7, further comprising:

obtaining, after the updating, a second input address, wherein the second input address is in a first format;

performing the address validation on the second input address using the updated validation model and the maximized dataset to obtain a second validation result, wherein the second validation result indicates a match to a second address of the maximized dataset, and wherein the second address of the maximized dataset is in a second format.

13. A system, comprising:

a processor; and memory comprising instructions, which when executed by the processor, cause the processor to perform a method, the method comprising:

obtaining, by a data system, two entity datasets, wherein each of the two entity datasets comprises data for a plurality of entities;

in response to obtaining the two entity datasets, performing a data distillation on the two entity datasets to obtain an optimized dataset, wherein performing the data distillation comprises:

performing a dimension reduction on the two entity datasets to obtain a condensed dataset;

analyzing the condensed dataset to obtain a feature set;

identifying a first pattern of data for a first feature of the feature set;

generating first synthetic data using the first pattern of data;

identifying a second pattern of data for a second feature of the feature set;

generating second synthetic data using the first pattern of data; and preparing the condensed dataset, the first synthetic data, and the second synthetic data for model training to obtain the optimized dataset;

performing a mutual information maximization on the optimized dataset and the two entity datasets to obtain a maximized dataset;

obtaining, after obtaining the maximized dataset, an input address to be validated;

performing an address validation on the input address using a validation model and the maximized dataset to obtain a validation result, wherein the validation result indicates whether the input address matches to one of the entities in the maximized dataset;

performing a conformal prediction on the input address using a conformal prediction model to obtain a confidence score of the validation result; and updating the validation model based on the confidence score, the validation result, and the input address to obtain an updated validation model.

14. The system of claim 13, wherein the first synthetic data and the second synthetic data is generated using a generative adversarial network (GAN).

15. The system of claim 13, wherein a first entity dataset of the two entity datasets is obtained from a first data source, wherein a second entity dataset of the two entity datasets is obtained from a second data source, and wherein the first data source and the second data source are independent from each other.

16. The system of claim 13, wherein the maximized dataset comprises an address of a first entity in a first format, and wherein the input address is associated with the first entity, and wherein the input address is in a second format.

17. The system of claim 13, wherein the mutual information maximization comprises an iterative updating of features on the optimized dataset and calculating a mutual information score for an iteration of the optimized dataset.

* * * * *